Oct. 19, 1965         A. C. SANFORD         3,212,389
REINFORCED CONNECTOR PLATE

Filed Feb. 25, 1963                    2 Sheets-Sheet 1

INVENTOR.
ARTHUR CAROL SANFORD
BY *Hamilton & Cook*
ATTORNEYS

Oct. 19, 1965     A. C. SANFORD     3,212,389

REINFORCED CONNECTOR PLATE

Filed Feb. 25, 1963     2 Sheets-Sheet 2

INVENTOR.
ARTHUR CAROL SANFORD
BY Hamilton & Cook
ATTORNEYS

United States Patent Office 3,212,389
Patented Oct. 19, 1965

3,212,389
REINFORCED CONNECTOR PLATE
Arthur Carol Sanford, Fort Lauderdale, Fla., assignor to Sanford Industries, Inc., Pompano Beach, Fla., a corporation of Florida
Filed Feb. 25, 1963, Ser. No. 260,769
1 Claim. (Cl. 85—13)

This application is a continuation-in-part of my copending application, Serial No. 196,060, filed May 21, 1962.

The present invention relates generally to connector plates for connecting wooden members together at a joint and more particularly to connector plates having a plurality of punched out teeth which are pressed into the wood of the two members to be connected. Specifically, the present invention relates to a connector plate in which the cross sectional tensile strength of the plate, the aggregate shear strength of the teeth and the aggregate holding power of the teeth are in balance.

Toothed connector plates are particularly adapted for connecting wooden structural members at their joints. In general, it has been the opinion of experts in the art that the ultimate strength a connector plate could impart to a joint is controlled by the value of the holding power of the teeth. Hence, in most known prior art constructions, the failure load causes the plates to buckle and extract the teeth well before the aggregate shear strength was reached.

Of course, increasing the number of teeth would theoretically increase the holding power of the plates but this is inefficient for several reasons. Increasing the holding power of the plates by increasing the number of teeth would also unnecessarily increase the aggregate shear strength, thus maintaining the inefficient disparity between the aggregate shear strength and the holding power. Furthermore, increasing the number of teeth per unit of plate area would not only cause the wood fibers to be cut at too close intervals and weaken the wooden members but would also weaken the plate in tension by reducing the amount of metal between adjacent teeth; and, were the plate size increased in proportion to the increased number of teeth, there would be the further disadvantage of compounding the inefficiency by the additional metal required to manufacture plates of the increased size. Moreover, in some situations the size of the wooden structural members themselves limits the size of the connector plates which can be used.

In my copending application, Serial No. 196,060, filed May 21, 1962, for example, I disclosed a plate construction which so increased the holding power of the teeth that loading tests revealed that the plate now failed under cross sectional tensile stress before either the teeth pulled out of the wood or before the aggregate shear strength of the teeth was exceeded. The concept of the present invention is accordingly disclosed as utilizing the tooth construction of my prior application, Serial No. 196,060. However, the concept of the present invention is not so limited but is equally adaptable to any plate in which the aggregate holding power and the aggregate shear strength of the teeth exceed the cross sectional tensile strength of the plates.

It is therefore an object of the present invention to provide a toothed connector plate of any given size having an increased cross sectional strength.

It is another object of the present invention to provide a tooth connector plate in which the cross sectional tensile strength, the aggregate shear strength of the teeth, and the aggregate holding power of the teeth are substantially in balance.

It is a further object of the present invention to provide a means for increasing the cross sectional tensile strength of a toothed connector plate without increasing the contact area of the connector plate with the wooden structural members being joined thereby.

It is a still further object of the present invention to provide a means for increasing the cross sectional tensile strength of a toothed connector plate without increasing the gauge of the metal used to make the plate and, therefore, without increasing the aggregate shear strength of the teeth in proportion to the holding power of the teeth.

It is a still further object of the present invention to provide a toothed connector plate having a cross sectional tensile strength in balance with the aggregate holding power and aggregate shear strength of the teeth which is economical to produce and capable of being applied to join wooden structural members as simply, efficiently and with the same apparatus used to apply previously known connector plates.

These and other objects which will become apparent from the following specification are accomplished by a means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

While the concept of the present invention is applicable to both the "exterior" or "sandwich" type connector plates, the present invention relates primarily to "exterior" plates with some modifications required to adapt the concept to the "sandwich" plates.

The exterior plate is used to connect structural members that are joined in abutting relation; the sandwich plate is used to connect structural members that are joined in overlapping relation.

In general, a connector plate embodying the concept of the present invention has a toothed portion and a toothless appendage portion. In the sandwich type plate the toothless appendage portion is preferably coplanar with the toothed portion, while in the exterior type plate the toothless appendage portion is more pictorially defined as a "wing" portion which overlies the toothed portion in exterior continuous relation when the plate is in operative position.

Figure 1:
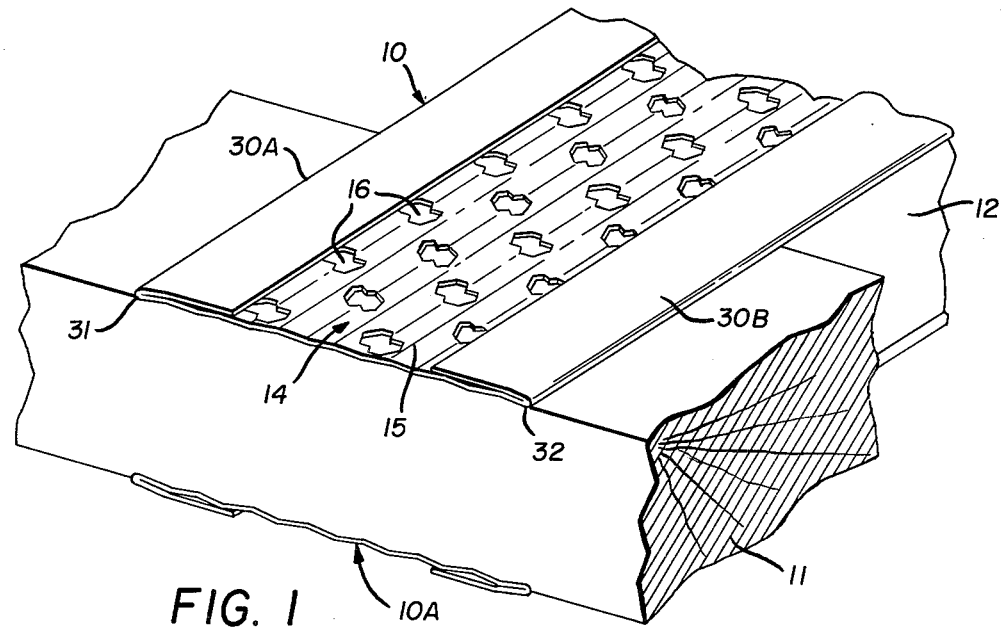
FIG. 1 is a trimetric perspective of a connector plate according to the present invention in operative condition joining a butt joint of two wooden structural members.
Figure 2:
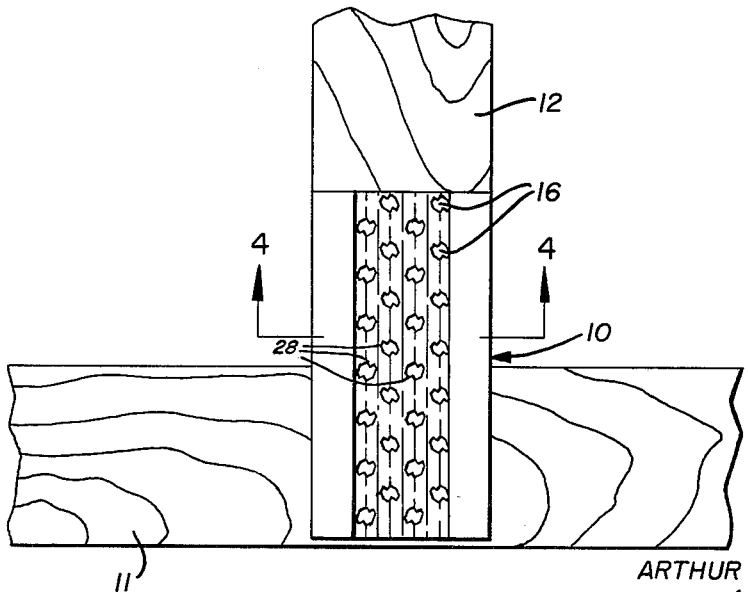
FIG. 2 is a top plan view of a connector joint, as shown in FIG. 1.

Referring to FIGS. 1 and 2, an exterior connector plate according to the present invention, designated generally by the numeral 10, is shown connecting two wooden structural members 11 and 12. The wooden members 11 and 12 are joined in butting relation and are representative of a typical truss joint, e.g., member 11 represents a lower chord member and member 12 represents the king post. Preferably, a similar plate 10A is applied to the opposite side of the joint as well.

Figure 3:
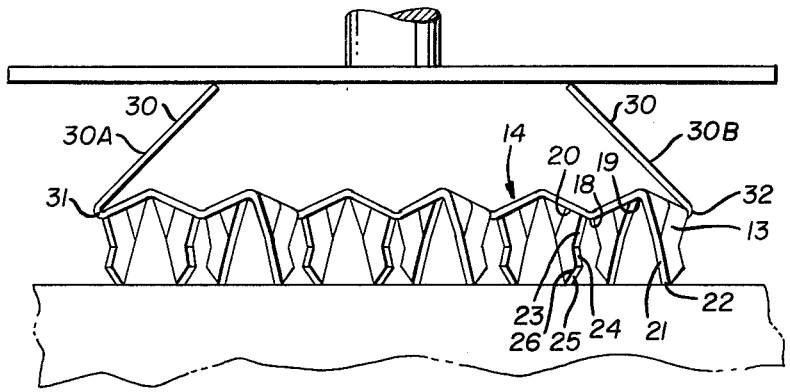
FIG. 3 is an end elevation of a connector plate according to the present invention just before it is pressed into the wooden members it is intended to join.
Figure 4:
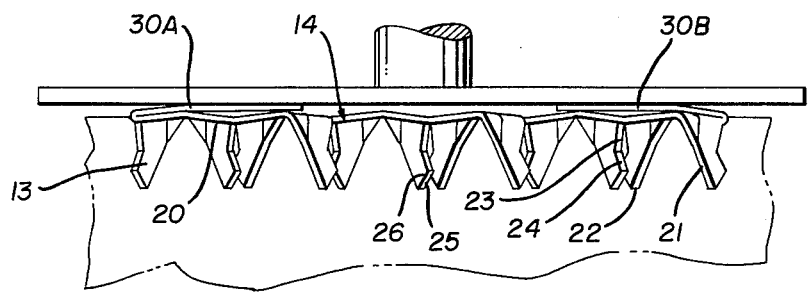
FIG. 4 is a cross section taken substantially on line 4—4 of FIG. 2.
Figure 5:
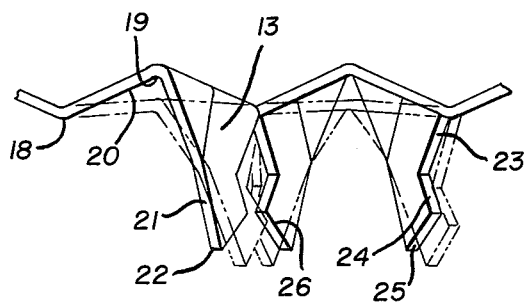
FIG. 5 is an enlarged portion of FIG. 3 depicting the teeth of the connector in detail and showing, in phantom overlay, the disposition of the teeth after the plate has been applied to the joint.

The teeth, indicated generally by the numeral 13 in FIGS. 3–5, are embedded into the wood of the structural members 11 and 12 and are of such construction that the aggregate holding power of the teeth exceeds the cross sectional tensile strength of connector plates constructed in accordance with prior known concepts.

The first known construction of teeth imparting such vastly superior holding powers is completely disclosed by my copending U.S. application, Serial No. 196,060 and is described sufficiently herein to fully disclose the present concept.

The main body, or toothed portion, 14 of the connector plate 10 has corrugations 15 with the teeth 13 punched from openings 16 spaced at intervals along each corrugation. As is best shown in FIG. 3, each corrugation has a crest and valley which, with reference to the side of the plate from which the teeth extend, are indicated by the numerals 18 and 19, respectively.

Each tooth 13 is connected to the body or toothed portion 14 along a base 20. Although, as thoroughly explained in my copending application, Serial No. 196,060, the bases of the teeth in alternate rows are preferably oriented at approximately 90° to the bases of the teeth in the other rows and openings 16 are preferably staggered relative to each other in alternate rows, each tooth is particularly oriented with respect to the corrugations in which the base 20 is attached.

Each tooth has an inclined rearward edge 21 extending from the base to the outer extremity, or point 22. In relation to the corrugations 15, the inclined edge 21 extends from the valley 19 outwardly to the point 22.

The other, or leading, edge of the tooth 13 extends outwardly from the crest 18 of the corrugations 15. The shank portion 23 at the leading edge is slightly rearwardly inclined—i.e., convergent with the rearward edge 21—and, approximately half way between the base 20 of the tooth 13 at the crest 18 and the point 22, intersects a negatively inclined portion 24 which generally parallels the rearward edge 21 until it, in turn, intersects the positively inclined head portion 25. The intersection of the portions 24 and 25 form a hook 26 on the head of the tooth in proximity to the point 22, which is itself formed by the intersection of the rearward edge 21 and the inclined head portion 25.

To achieve the maximum holding power, the base 20 of each tooth 13 extends generally along the slope of the corrugation between a crest 18 and a valley 19 with the hook 26 disposed toward the crest 18 of the corrugation 15 to which the base 20 is attached. Thus, when the plate 10 is flattened, the teeth tilt laterally and the hook 26 is driven into the wood well beneath the surface.

The tooth does not begin to tilt laterally until the plate begins to flatten and the plate does not flatten until the crest 18 of the corrugations 50 contact the surface of the wood. Thereafter, continued substantial pressure tends to flatten the corrugations, causing the teeth to continue to penetrate the wood well below the surface as the tooth tilts. Inclined rearward edge 21 of each tooth 13 acts as an inclined plane to assist in the tilting of the teeth primarily initiated by the flattening of the corrugations 15 to which the base 20 of the teeth 13 are joined.

This tilting of the teeth is represented by comparison of FIG. 3 to FIG. 4, and particularly in FIG. 5 wherein the solid line representation depicts the teeth in their pre-insertion disposition and the chain line representation depicts the laterally tilted position assumed by the teeth after the corrugation have been substantially flattened.

In this way, only a minimum number of wooden fibers are cut and each individual tooth is held in position both by the natural resiliency of the wooden fibers as they grip the sides of the tooth and the now laterally embedded tooth which can only be removed by tearing all the fibers between the negatively inclined underedge 24 of the hook 26 and the surface of the wood.

The holding power of the teeth constructed in accordance with the above described concept is so improved over other teeth known in the prior art that in tests on a plate incorporating such teeth adjoining two wooden structural members, the plate was found to fail in tension before either an indication of shear failure between the tooth of the plate occurred or before the tooth began to withdraw from its inserted position. Such tensile failure would occur along a line through the holes from which the teeth were punched lying generally parallel to the joints, as represented by line 28 in FIG. 2.

Increasing the cross sectional strength by merely increasing the spacing between the holes from which the teeth were punched, does not provide a satisfactory solution. For example, the structural members being joined might be standard dimensional lumber such as two by fours which present only a limited surface area to which the teeth of the plate can be inserted. Thus, to increase the spacing between holes would correspondingly decrease the number of teeth available, and, while the tensile strength of the plate might be increased thereby, the aggregate holding power of the teeth is lessened in proportion to the number of teeth required to be eliminated, and the strength of the joint would be, accordingly, lessened.

Nor would increasing the gauge of the metal from which the plates are made to a thickness sufficient to supplement the deficient tensile strength, provide a satisfactory solution. With an increase in the thickness of the metal there is an attendant increase in the rigidity of the plates. Thickening the plates would restrict the lateral tilt of the teeth available by the pressure of the crest 18 against the softer surface of the wooden structural members. Furthermore, an increase in the gauge of the metal unnecessarily increases the thickness of the teeth, which not only correspondingly increases the already sufficient aggregate shear strength of the teeth but also tends to unnecessarily destroy the wood fibers upon insertion.

According to the concept of the present invention, the cross sectional tensile strength of the plates can be increased to be in balance with the aggregate holding power and aggregate shear strength of the teeth simply, efficiently, and without increasing the thickness of the standard 16–20 gauge of the metal used to fabricate the toothed connector plates.

One or more appendage portions 30 are joined to the sides of the toothed portion 14 of plate 10. When the plate is operatively positioned to join two wooden structural members, the appendage portion 30 is oriented generally transversely of the joint. The width of the appendage portion 30 can be varied by experimentation such that the cross sectional tensile strength of the plate is equated to the aggregate holding power and aggregate shear strength of the teeth on each side of the joint.

For example, in joining together two, two by fours in butting end relation it is customary to utilize a rectangular connector plate approximately three inches in width and sufficiently long so that approximately six inches of length are available on either side of the joint. By forming such a plate with appendages 30A and 30B each with only approximately one inch of width along the straight sides 31 and 32, respectively, of the rectilinear plate which is oriented so that the appendages 30A and 30B lie transversely of the joint, and folding the wing-like appendages back upon the toothed portion of the plate, the connector plate will have increased the strength of the joint more than two and one-half times the strength of the joints made with similar corrugated connector plates without the appendage portions.

A connector plate according to the concept of the present invention is preferably made from a unitary sheet of metal. Teeth of the appropriate configuration are punched from the central or toothed portion 14 of the plate 10 and a toothless edge, or appendage, portions 30A and 30B on each side of the toothed portion are folded along the edges 31 and 32 to which their appendage portions 30A and 30B are respectively joined to the toothed portion, so as to partially overlie the toothed portion 14 in the wing-like disposition shown in FIG. 3.

With the plate 10 so formed it can be appropriately located spanning the joint of two wooden structural members 11 and 12 and then, without the necessity for nails or other auxiliary holding means, pressed into the wooden structural members by a press means, such as that schematically represented and designated by the numeral 31.

The pressure exerted by the press means 31 to fully seat the teeth 13 partially flattens the corrugations 15 to laterally tilt the teeth, and folds the appendage portions 30 into contiguous relation with the back of the toothed portion 14.

When using a connector plate constructed in accordance with the concept of the present invention the cross sectional tensile strength, the aggregate shear strength of the teeth and the aggregate holding power of the teeth are in balance to provide a much stronger joint between wooden structural members so joined than has been heretofore possible with connector plates of comparable size and weight. The objects of the invention have thus been accomplished.

What is claimed is:

A connector plate for connecting wooden structural members at their joints comprising, a rectilinear toothed portion having opposed sides, said plate having corrugations and a plurality of teeth, each corrugation having slopes forming at least one crest and one valley, said teeth punched out of said toothed portion such that each tooth has a base traversing the slope of a corrugation from the crest to the valley of said slope, each tooth having a positively inclined inner leading edge portion and a negatively inclined rear edge extending from the base, said inner leading edge portion being convergent to said rear edge and adjacent to the crest on that side of the corrugation from which the tooth extends, an outer positively inclined leading edge portion intersecting said rear edge to form an outer point, a re-entrant notch formed between said inner and outer leading edge portions and having a negatively inclined edge extending from said inner edge portion and intersecting said outer leading edge portion to form a hook adjacent to said outer point, each said tooth being tiltable in the direction of said hook when said corrugations are flattened, a toothless appendage portion attached to each of the opposed sides of said corrugated toothed portion, said appendage portions being unitary with and of substantially the same thickness as said corrugated toothed portion, said appendage portions overlying that side of said toothed portion opposite the side from which said teeth extend and in contiguous relation therewith, said appendage portions oriented substantially transversely of the joint between the structural members joined by said connector plates.

References Cited by the Examiner

UNITED STATES PATENTS 2,974,378    3/61    Lidsky _____ 85—13
3,016,586    1/62    Atkins _____ 85—11

EDWARD C. ALLEN, *Primary Examiner.*